United States Patent
Vassieux et al.

(10) Patent No.: US 11,859,696 B2
(45) Date of Patent: Jan. 2, 2024

(54) MODULE FOR A SYSTEM FOR SYNCHRONIZING AND DRIVING A TRANSMISSION GEARBOX COUNTERSHAFT

(71) Applicant: VALEO EMBRAYAGES, Amiens (FR)

(72) Inventors: Loic Vassieux, Cergy Pontoise (FR); Dominique Lheureux, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 17/668,951

(22) Filed: Feb. 10, 2022

(65) Prior Publication Data
US 2022/0268341 A1 Aug. 25, 2022

(30) Foreign Application Priority Data

Feb. 22, 2021 (FR) ...................................... 21 01674

(51) Int. Cl.
*F16H 3/12* (2006.01)
*F16H 3/091* (2006.01)
(Continued)

(52) U.S. Cl.
CPC ............... *F16H 3/126* (2013.01); *B60K 6/36* (2013.01); *F16H 3/091* (2013.01); *F16H 63/36* (2013.01);
(Continued)

(58) Field of Classification Search
CPC ........... F16H 3/126; F16H 3/091; B60K 6/36; B60K 6/48; B60K 6/547
(Continued)

(56) References Cited

U.S. PATENT DOCUMENTS 3,478,851 A 11/1969 Smyth et al.
5,195,600 A * 3/1993 Dorgan ................... F16H 47/04
180/9.1

(Continued)

FOREIGN PATENT DOCUMENTS

IT 102018000007576 A1 1/2020
JP 07-167278 A 7/1995

OTHER PUBLICATIONS

French Preliminary Search Report dated Nov. 25, 2021 in French Application 21 01674 filed on Feb. 22, 2021, 10 pages (with English Translation of Categories of Cited Documents & Written Opinion).

*Primary Examiner* — Ha Dinh Ho
(74) *Attorney, Agent, or Firm* — Oblon, McClelland, Maier & Neustadt, L.L.P.

(57) ABSTRACT

A module for a system for driving and synchronizing a countershaft of a transmission gearbox. The module includes a coupling device having an input element intended to be rotationally coupled to a reversible electric machine and an output element intended to be rotationally coupled to the countershaft. The coupling device has a coupled state in which the clutch device is able to transmit torque between the input element and the output element and an uncoupled state in which the input element and the output element are uncoupled. Also included is a lock-up device which has a lock-up state in which said lock-up device blocks the rotation of the input element of the clutch device, and a released state in which said lock-up device allows the input element to rotate.

20 Claims, 3 Drawing Sheets

(51) Int. Cl.
  *F16H 63/36* (2006.01)
  *B60K 6/48* (2007.10)
  *B60K 6/547* (2007.10)
  *B60K 6/36* (2007.10)
(52) U.S. Cl.
  CPC ............ *B60K 6/48* (2013.01); *B60K 6/547* (2013.01); *B60Y 2200/92* (2013.01)
(58) Field of Classification Search
  USPC .................................................. 74/325, 661
  See application file for complete search history.

(56) References Cited

U.S. PATENT DOCUMENTS

| | | | | |
|---|---|---|---|---|
| 5,337,848 A * | 8/1994 | Bader | ................... | B60W 10/08 903/909 |
| 5,775,449 A * | 7/1998 | Moroto | ................... | B60K 6/387 903/910 |
| 6,142,907 A * | 11/2000 | Minowa | ................ | B60W 20/40 180/65.23 |
| 8,292,780 B2 * | 10/2012 | Jerwick | ................ | B60W 10/08 477/5 |

* cited by examiner

MODULE FOR A SYSTEM FOR SYNCHRONIZING AND DRIVING A TRANSMISSION GEARBOX COUNTERSHAFT

TECHNICAL FIELD

The invention relates to the field of vehicle transmissions and is more particularly concerned with a module for a system for synchronizing and driving a transmission gearbox countershaft and with a method for controlling such a synchronization and drive system.

TECHNOLOGICAL BACKGROUND

Vehicle transmission gearboxes comprising a primary shaft intended to be driven by a combustion engine of the vehicle, a secondary shaft intended to drive the driven wheels of the vehicle, and a countershaft able to be coupled to the output shaft and to the input shaft by gear sets corresponding to different gear ratios, are known.

Document WO04013517 teaches the use of a gearbox brake coupled to the countershaft of the transmission gearbox to slow the countershaft during the transient phases of a change in gear ratio, to assist with synchronizing the transmission gearbox and thus reduce the length of the transient phases of a change in gear ratio.

Documents GB1435517 and AT520019 disclose a reversible electric machine which is permanently coupled to the countershaft of the transmission gearbox. The reversible electric machine is thus able to operate in generator mode to reduce the speed of the countershaft or in motor mode to increase the speed of the countershaft during the transient phases of the change in gear ratio so as to assist with synchronizing the transmission gearbox. In those documents, the reversible electric machine is always connected to the countershaft and thus generates a drag torque that increases the fuel consumption of the main engine. In addition, in the event of a malfunctioning of the reversible electric machine, or when the battery has reached its maximum charge such that use of the reversible electric machine for slowing the countershaft would carry the risk of damaging this battery, it is then no longer possible to brake the countershaft of the transmission gearbox during the transient phases of the change in gear ratio, and this poses notably problems in terms of safety.

SUMMARY

One idea behind the invention is to propose a module for a system for driving and synchronizing a countershaft which is able to overcome the disadvantages of the prior art by allowing a reversible electric machine to be used to synchronize the transmission gearbox without increasing the consumption of the main engine or jeopardizing the safety of the vehicle.

In order to do that, according to one embodiment, the invention relates to a module for a system for driving and synchronizing a countershaft of a transmission gearbox, said module comprising:
- a bearing part intended to be mounted without the ability to rotate on the chassis of the vehicle;
- a coupling device able to rotate with respect to the bearing part comprising an input element intended to be rotationally coupled to a reversible electric machine and an output element intended to be rotationally coupled to the countershaft, the coupling device having a coupled state in which the clutch device is able to transmit torque between the input element and the output element and an uncoupled state in which the input element and the output element are uncoupled; and
- a lock-up device which has a lock-up state in which said lock-up device blocks the rotation of the input element of the clutch device with respect to the bearing part, and a released state in which said lock-up device allows the input element to rotate with respect to the bearing part.

Thus, thanks to the coupling device, the reversible electric machine can be uncoupled from the countershaft outside of the transient phases of the change in gear ratio, thereby making it possible to reduce the consumption of the main engine.

Furthermore, by placing the lock-up system in the lock-up state, the coupling device is capable of acting like a gearbox brake without placing demands on the reversible electric machine, particularly in the event of failure of the reversible electric machine or when the battery powering the reversible electric machine has reached its maximum charge.

According to other advantageous embodiments, such a module may have one or more of the following features.

According to one embodiment, the input element is supported and rotationally guided by the bearing part.

According to one embodiment, the lock-up device comprises a mobile element able to move between a lock-up position in which said mobile element is in contact with the input element in order to block the rotation thereof, and a released position in which said mobile element is distanced from the input element in order to allow the rotation thereof. Thus, the lock-up is performed directly on the input element, thereby avoiding angular lash between the point of application of the lock-up force and the input element of the clutch device and thus makes it possible to optimize the performance of the coupling device when it is acting as a gearbox brake, to limit undesirable noise and to increase the reliability of the drive and synchronization system.

According to one embodiment, the input element comprises an input hub which is supported and guided in rotation inside the bearing part and, in the lock-up position, the mobile element is in contact with the input hub.

According to one embodiment, the lock-up device comprises a plurality of orifices made on an external perimeter of the input hub and the mobile element is a pin which is mounted with the ability to slide in a bore made in the bearing part and which has an end which is inserted into one of the orifices when the pin is in the lock-up position.

According to one embodiment, the orifices have chamfered entrances to facilitate insertion of the pin into the orifices in the lock-up position. According to one alternative embodiment, or in addition, the pin has a chamfered end to facilitate insertion of the pin into the orifices in the lock-up position.

According to one embodiment, the lock-up device comprises a return member configured to return the mobile element to the released position and is connected to a pneumatic or hydraulic operating circuit which is configured to move the mobile element towards the lock-up position. This makes it possible to limit the energy consumption of the lock-up device because the lock-up device will spend more of its time in the released state and will be in the lock-up state only on rare occasions.

According to another embodiment, the lock-up device may comprise a plurality of teeth made on an external perimeter of the input hub and the mobile element is a lever articulated about an axis Y parallel to and distant from the axis of rotation X of the countershaft and which has an end which is inserted between two teeth when the lever is in the lock-up position.

According to one embodiment, the module further comprises a reduction gearset which is coupled to the input element of the coupling device and is intended to rotationally couple the input element of the coupling device to the reversible electric machine and, in the lock-up state, the lock-up device collaborates with a gear of the reduction gearset in order to block the rotation thereof.

According to one embodiment, the coupling device is a multidisc wet clutch device. Because such a coupling device has improved cooling capabilities and fairly noiseless operation, it is particularly suitable for use as an engine brake.

According to one embodiment, the invention also relates to a system for driving and synchronizing a countershaft of a transmission gearbox comprising an aforementioned module and a reversible electric machine comprising a rotor which is coupled to the input element of the coupling device.

According to one embodiment, the rotor of the reversible electric machine is coupled to the input element of the coupling device by a reduction gearset.

According to one embodiment, the invention also relates to a transmission assembly comprising a transmission gearbox which comprises a primary shaft intended to be connected to a main engine, a secondary shaft intended to be connected to the driven wheels of a vehicle, and a countershaft able to be coupled to the output shaft and to the input shaft by gearsets, the transmission assembly further comprising an aforementioned drive and synchronization system, the output element of the coupling device being rotationally coupled to the countershaft.

According to one embodiment, the invention also relates to a vehicle comprising an aforementioned transmission assembly, a main engine connected to the primary shaft by a clutch device and driven wheels connected to the secondary shaft.

Finally, according to one embodiment, the invention relates to a method for controlling a system for driving and synchronizing a countershaft of a transmission gearbox, comprising the step of moving the lock-up device from the released state to the lock-up state in response to the detection of a critical event.

According to one embodiment, the critical event is indicative of a malfunctioning of the reversible electric machine, of a state of charge of a battery that powers the reversible electric machine that is above a maximum charge threshold, of a temperature lower than a minimum temperature of use of the battery or of a temperature higher than a maximum temperature of use of the battery.

According to one embodiment, in response to an instruction to change the gear ratio when the lock-up device is in the lock-up state, the coupling device is controlled according to a signal representative of a setpoint rotational speed of the countershaft so that the coupling device applies a resistive torque that allows the countershaft to attain the setpoint rotational speed of the countershaft.

BRIEF DESCRIPTION OF THE FIGURES

The invention will be better understood, and other aims, details, features and advantages thereof will become clearer, from the following description of a plurality of particular embodiments of the invention, provided solely by way of non-limiting illustration, with reference to the appended drawings.

DESCRIPTION OF THE EMBODIMENTS

Figure 1:
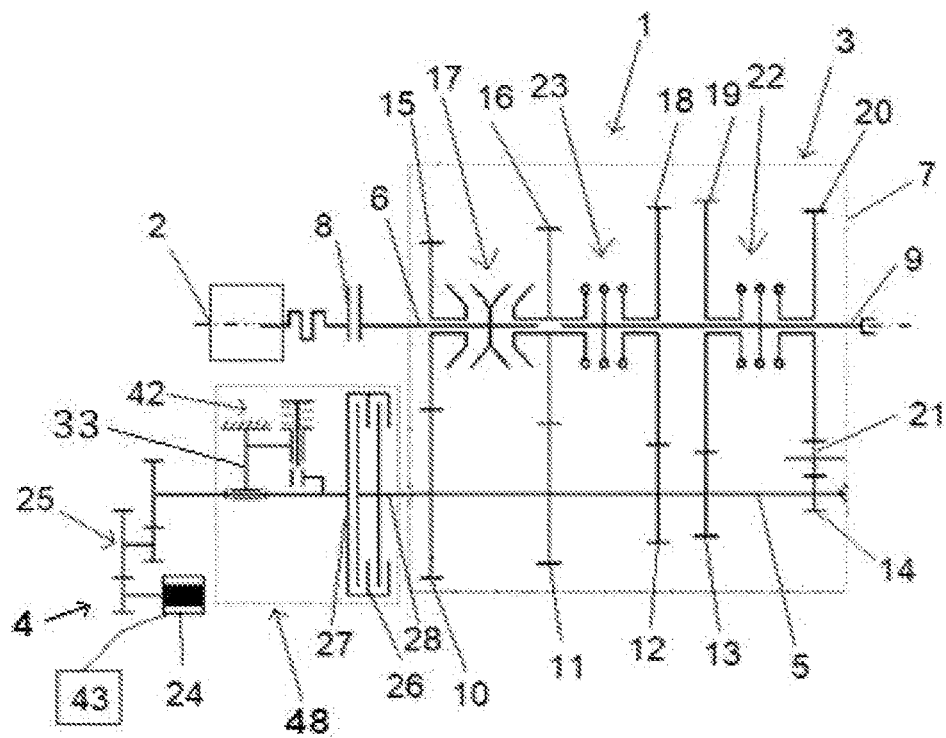
FIG. 1 illustrates a drivetrain of a vehicle equipped with a system for driving and synchronizing the countershaft of the transmission gearbox.

FIG. 1 depicts a drivetrain 1 of a vehicle which comprises a main engine 2, for example a combustion engine, a transmission gearbox 3 and a system 4 for driving and synchronizing a countershaft 5 of the transmission gearbox 3.

The main engine 2 is connected to a primary shaft 6 of the transmission gearbox 3 by means of a clutch device 8 of any appropriate type, for example a slip clutch. The clutch device 8 has an engaged state in which it is able to transmit torque between the main engine 2 and the primary shaft 6 of the transmission gearbox 3, and a disengaged state in which the main engine 2 and the primary shaft 6 of the transmission gearbox 3 are uncoupled.

The transmission gearbox 3 is housed inside a transmission casing 7. The transmission gearbox 3 comprises a primary shaft 6, a countershaft 5 and a secondary shaft 9 which is intended to be connected to the driven wheels of the vehicle via a differential, not depicted. The transmission gearbox 3 comprises countershaft gear wheels 10, 11, 12, 13, 14 which rotate as one with the countershaft 5. The transmission gearbox 3 also comprises two primary gear wheels 15, 16 which are coaxial with the primary shaft 6 and each form a gearset with one of the countershaft gear wheels 10, 11. A three-position dual synchronizer 17 allows one or other of the primary gear wheels 15, 16 to be coupled to the primary shaft 6, and has a neutral position in which neither one of the primary gear wheels 15, 16 is coupled to the primary shaft 6.

The transmission gearbox 3 also comprises secondary gear wheels 18, 19, 20, which are coaxial with the secondary shaft 9. The secondary gear wheels 18, 19, 20 each form, with one of the countershaft gear wheels 12, 13, 14, a gearset. The gearsets formed by the secondary gear wheels 18, 19, 20 and the corresponding countershaft gear wheels 12, 13, 14 are in permanent mesh. One of the gearsets has an additional gearwheel 21 between one of the secondary gear wheels 20 and one of the countershaft gear wheels 14 in order to create a reverse gear ratio able to reverse the direction of rotation of the secondary shaft 9. A three-position dog coupling 22 without synchronizer, positioned between two of the secondary gear wheels 19, 20, makes it possible to either couple one or other of the two associated secondary gear wheels 19, 20 to the secondary shaft 9, or, in a neutral position, to keep the secondary gear wheels 19, 20 uncoupled from the secondary shaft 9.

In the embodiment depicted, the axis of revolution of the primary shaft 6 is aligned with the axis of revolution of the secondary shaft 9. Furthermore, the primary gear wheel 16 is positioned so that it straddles one end of the primary shaft 6 and one end of the secondary shaft 9. Thus, said primary gear wheel 16 can also be used as a secondary gear wheel by being rotationally coupled to the secondary shaft 9. To this end, a three-position dog coupling 23, positioned between said primary gear wheel 16 and the secondary gear wheel 18, makes it possible to couple either the primary gear wheel 16 or the secondary gear wheel 18 to the secondary shaft 9, and also makes it possible, in a neutral position, to keep the primary gear wheel 16 and the secondary gear wheel 18 uncoupled from the secondary shaft 9. A transmission gearbox 3 such as this thus has six forward gears and two reverse gears that can, if applicable, be coupled at the output of the secondary shaft 9 to a planetary gearset (not illustrated) in order to obtain a 12-speed transmission gearbox.

The drive and synchronization system 4 is associated with the countershaft 5 of the transmission gearbox 3 in order to drive or brake same. The drive and synchronization system 4 comprises a reversible electric machine 24 powered by a battery 43, a reduction gearset 25 and a coupling device 26.

The reversible electric machine 24 comprises a stator and a rotor which is connected to the coupling device 26 via the reduction gearset 25. The coupling device 26 has a coupled state in which it is able to transmit torque between the reversible electric machine 24 and the countershaft 5, and an uncoupled state in which the transmission of torque between the reversible electric machine 24 and the countershaft 5 is interrupted.

The drive and synchronization system 4 is notably intended to be used during the transient phases in the change in gear ratio of the transmission gearbox 3. Specifically, during these transient phases, the reversible electric machine 24 may be used as an electric motor to increase the rotational speed of the countershaft 5 or as an electrodynamic brake to decrease the rotational speed of the countershaft 5. This adapting of the rotational speed of the countershaft 5 thus makes it possible to reduce the length of the transient phases in the change in gear ratio.

Outside of the transient phases, the reversible electric machine 24 may also be used in a motor mode, in which the reversible electric machine 24 supplies a driving torque to the wheels. The reversible electric machine 24 is capable of being used jointly with the main engine 2 to supply additional power for the traction of the vehicle. In that case, the clutch device 8 is in the engaged configuration. According to one embodiment, the reversible electric machine 24 may also be used in a mode in which the vehicle traction is purely electric. In such a mode of operation, the clutch device 8 is then in the disengaged configuration. Moreover, the reversible electric machine 24 may also be used, in a current generator mode, to recharge the battery 43.

Outside of the transient phases and when the reversible electric machine 24 is being used neither in a current generator mode nor in a motor mode, the coupling device 26 is positioned in the uncoupled state so as to limit the drag torque liable to be generated by the reversible electric machine 24, thereby making it possible to reduce the fuel consumption of the main engine 2.

Figure 2:
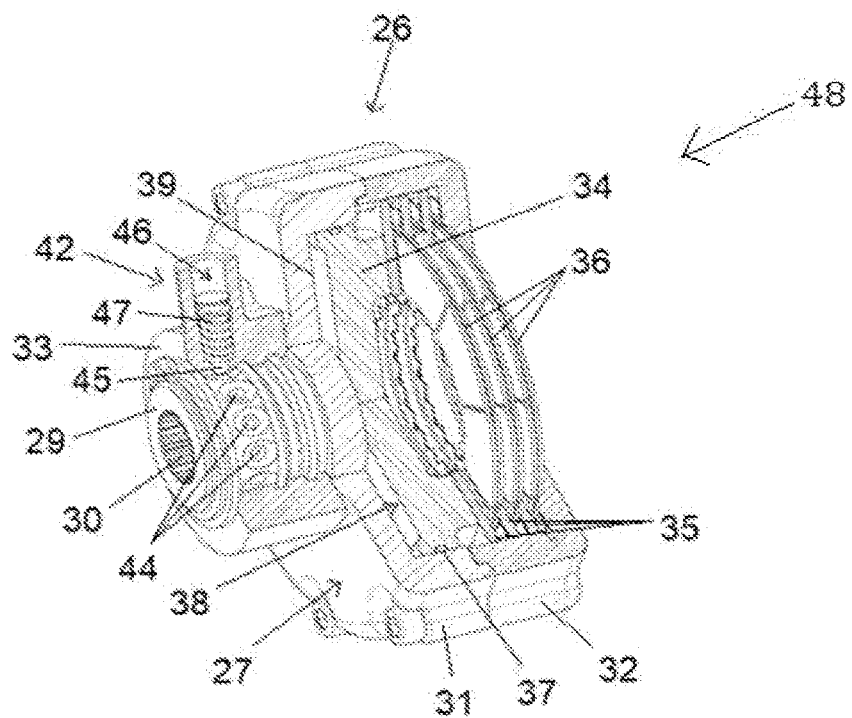
FIG. 2 is a partial view, in perspective and with cutaway, depicting the clutch device and the lock-up device of the drive and synchronization system of FIG. 1.
Figure 3:
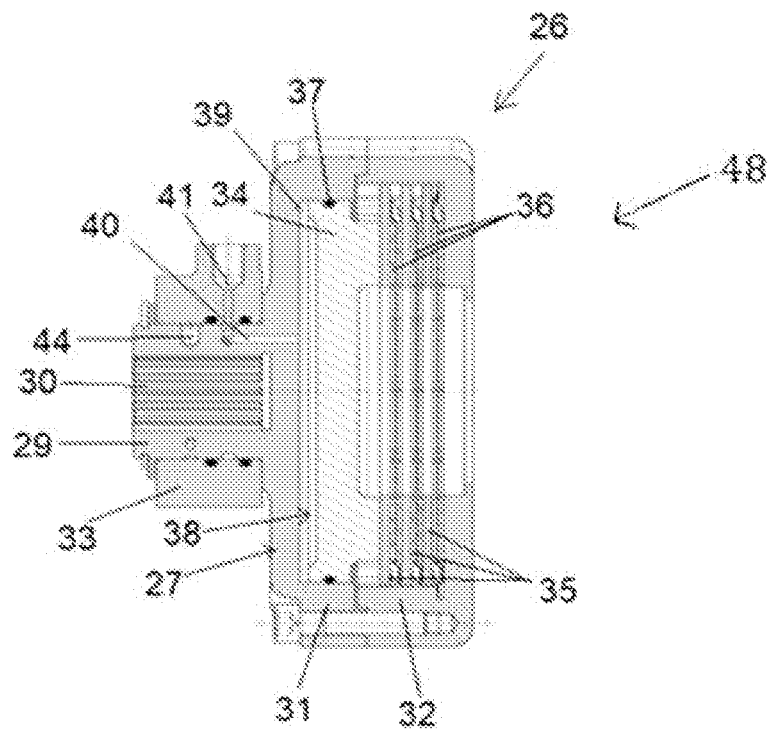
FIG. 3 is a view in cross section of the clutch device and of the lock-up device of FIG. 2.
Figure 4:
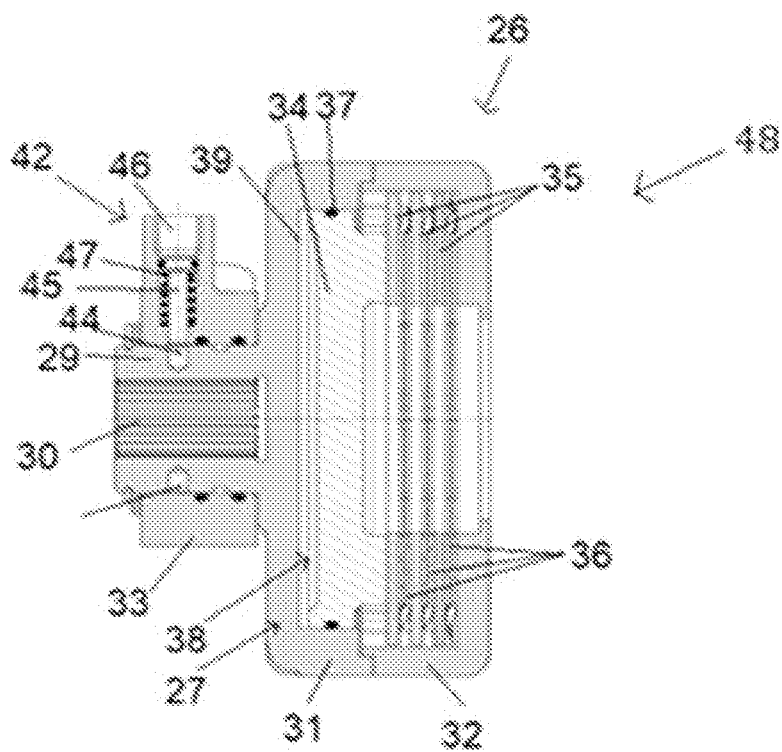
FIG. 4 is another view in cross section of the clutch device and of the lock-up device of FIG. 2, on a different plane of section.

In connection with the first embodiment of FIGS. 2 to 4, there may be seen a module 48 according to a first embodiment comprising a bearing part 33 mounted without the ability to rotate on the chassis of the vehicle, and a coupling device 26 of the drive and synchronization system 4.

The coupling device 26 comprises an input element 27 which is coupled to the reversible electric machine 24 and an output element 28 (indicated schematically in FIG. 1 only and not depicted in FIGS. 2 to 4) which is coupled to the intermediate shaft 5. In the coupled state, the coupling device 26 is able to transmit torque between the input element 27 and the output element 28. By contrast, in the uncoupled state, the transmission of torque between the input element 27 and the output element 28 is interrupted.

The input element 27 comprises an input hub 29. The input hub 29 comprises internal splines 30 and is intended to accept a splined end of a shaft, not depicted, which is coupled to the reversible electric machine 24 via the reduction gearset 25. The input hub 29 is supported and guided in rotation inside a bearing part 33 which is fixed to a casing of the drivetrain 1 (the casing is not depicted), and which is intended to be fixed to the chassis of the vehicle. According to a variant of the invention, the bearing part 33 can be a plain bearing. According to another variant of the invention, a needle or ball bearing can be inserted radially between the bearing part 33 and the input hub 29.

In the embodiment depicted, the coupling device 26 is a multidisc wet coupling device. The input element 27 comprises two half-casings 31, 32 fixed together and together defining an internal space housing a multidisc assembly intended to transmit torque between the input element 27 and the output element 28 when said coupling device 26 is in the coupled state, an actuating piston 34, and a hydraulic fluid such as oil.

The multidisc assembly comprises a plurality of annular plates 35, for example made of steel, which rotate as one with the input element 27 and are mounted with the ability to slide axially with respect to the latter. To do that, each plate 35 on its external periphery has an external toothset which is in mesh with the internal toothset formed on the inside of a cylindrical skirt of one of the half-casings 31, 32 of the input element 27. The multidisc assembly further comprises a plurality of friction discs 36 which are interposed between the plates 35. The friction discs 36 rotate as one with the output element 28 with the freedom to move in axial translation. For that purpose, the output element 28 comprises an external toothset and each friction disc 36 comprises, on its internal periphery, and internal toothset which is in mesh with the external toothset of the output element 28. Each friction disc 36 comprises friction linings arranged on each of its front and rear faces.

Moreover, the actuating piston 34 is mounted with the ability to move axially inside the internal space of the input element 27. The actuating piston 34 comprises, on its external periphery, a seal 37 which collaborates sealingly with the cylindrical skirt of the half-casing 31 so as to define a variable-volume sealed chamber 38 between the actuating piston 34 and the end wall 39 of the half-casing 31. Moreover, the end wall 39 of the half-casing 31 has a duct 40, visible in FIG. 3, which is connected to a hydraulic circuit fitted with a pump, not depicted, by means of a duct 41 formed in the bearing part 33.

When the variable-volume sealed chamber 38 is supplied with pressurized fluid to move the coupling device 26 toward a coupled state, the actuating piston 34 moves towards the multidisc assembly so that the friction discs 36 are squeezed between the plates 35 and torque is thus transmitted between the input element 27 and the output element 28.

Conversely, when the hydraulic fluid is expelled from the variable-volume sealed chamber 38, the actuating piston 34 slides away from the multidisc assembly so that the friction disc 36 and the plates 35 return to an uncoupled position in which they are spaced axially away from one another.

Moreover, the module 48 further comprises a lock-up device 42, notably visible in FIGS. 2 and 4, which has a lock-up state in which it blocks the rotation of the input element 27 with respect to the bearing part 33 and a released state in which it allows the input element 27 to rotate with respect to said bearing part 33. Thus, when the lock-up device 42 is in the lock-up state, the coupling device 26 can, during the transient phases in the change in gear ratio of the transmission gearbox 3, be made to brake the countershaft 5. The coupling device 26 then acts as a gearbox brake without placing demands on the reversible electric machine 24. Such a lock-up state is notably used in the event of failure of the reversible electric machine 24 or when the battery 43 associated with the reversible electric machine 24 has reached its maximum charge such that use of the reversible electric machine 24 to brake the countershaft 5 would carry the risk of damaging the battery 43.

The make-up of the module 48 is not restricted to that of the first embodiment described in connection with FIGS. 2 to 4. For example, the module 48 may also comprise all or part of the reduction gearset 25, it being possible for the lock-up device 42 to be positioned anywhere on the path along which torque is transmitted between the rotor of the reversible electric machine 24 and the input element 27 of the coupling device 26.

Thus, the lock-up device 42 may notably be associated with one of the gears of the reduction gearset 25, with the shaft transmitting torque between the reduction gearset 25 and the input element 27 of the clutch, or directly associated with the input element 27 of the clutch device, as is the case in the embodiment depicted. This last arrangement is particularly advantageous in that it avoids angular lash between the point of application of the rotation blocking force applied by the lock-up device 42 and the input element 27 of the clutch device, such angular lash being liable to reduce the performance of the coupling device 26 when it is acting as a gearbox brake, to generate uncomfortable noise and to cause the drive and synchronization system 4 to deteriorate.

In the embodiment depicted, the lock-up device 42 comprises a plurality of orifices 44, visible in FIG. 2, uniformly distributed on the external periphery of the input hub 29 of the clutch device and a mobile pin 45 able to be inserted into one of said orifices 44. The pin 45 is mounted with the ability to slide in a bore 46 formed in the bearing part 33 between, on the one hand, a lock-up position in which the end of the pin 45 is inserted in one of the orifices 44 and thus blocks the rotation of the input element 27 and, on the other hand, a released position in which the end of the pin 45 is out of the orifices 44, allowing the input element 27 to rotate.

In the embodiment depicted, in order to make it easier for the pin 45 to be inserted into the orifices 44 in the lock-up position, the orifices 44 have chamfered entrances and the pin 45 has a chamfered end, the chamfered entrances and the chamfered end being configured to facilitate insertion of the pin 45 into the orifices 44.

The lock-up device 42 further comprises a return member 47, such as a helical spring, which is positioned between a shoulder of the bore 46 and a shoulder of the pin 45 and thus allows the pin 45 to be returned towards the released position. Moreover, the board 46 of the bearing part 33 communicates with a hydraulic or pneumatic circuit, not depicted, equipped with a pump allowing pressure to be applied to the pin 45 so as to move it into, and keep it in, the lock-up position.

Note that the lock-up device 42 is described hereinabove by way of example, and that the invention is not in any way restricted to the lock-up device 42 exhibiting such a structure. Thus, according to embodiment variants, the movement of the pin 45 between the lock-up position and the released position is brought about by an electric actuator. Furthermore, according to another embodiment, the lock-up device 42 is a dog-clutch coupling device. Such a dog-clutch coupling device comprises, for example, a sliding sleeve which comprises a set of teeth and is fixed in terms of rotation. The sliding sleeve is able to move axially between, on the one hand, a lock-up position in which the toothset of the sliding sleeve meshes with a complementary toothset that rotates as one with the input hub 29 in order to block the rotation of the latter and, on the other hand, a released position in which the toothsets are parted from one another in order to allow the input hub 29 to rotate.

Figure 5:
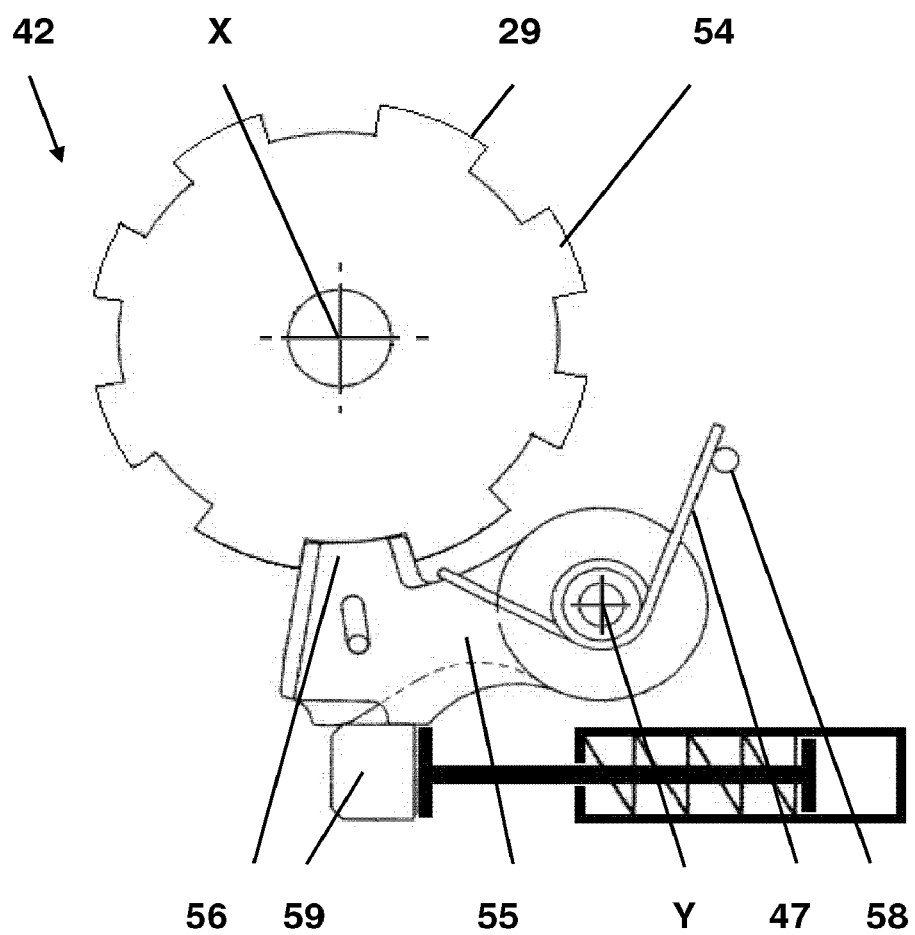
FIG. 5 is a face-on view of a second embodiment of the invention.

FIG. 5 describes a second embodiment of the invention in which the lock-up device 42 comprises a plurality of teeth 54 uniformly distributed around the external perimeter of the input hub 29 of the clutch device and a lever 55 able to be inserted between two teeth 54. The lever 55 is articulated about an axis Y parallel to and distant from the axis of rotation X of the countershaft 5 between, on the one hand, a lock-up position in which the end of the lever 55 is inserted between two teeth 54 and thus blocks the rotation of the input element 27 and, on the other hand, a released position in which the end of the lever 55 is out of the teeth 44, allowing the input element 27 to rotate.

In this second embodiment depicted, the lever 55 has an end 56 which is inserted between two teeth 54 when the lever is in the lock-up position. To facilitate the insertion of the lever 55 between two teeth 54 in the lock-up position, the teeth 54 have chamfered entrances and the lever 55 has chamfers on its end.

The lock-up device 42 further comprises a return member 47, such as a torsion spring, which is positioned between an end stop 58 formed on the lock-up device 42 and an orifice in the lever 55 and thus allows the lever 55 to be returned towards the released position. Moreover, the lever 55 is made to move by a pushrod 59 able to apply pressure on the lever 55 so as to move it into, and keep it in, the lock-up position.

A method for operating a drive and synchronization system 4 as described hereinabove, during the transient phases of a change in gear ratio, is described hereinbelow.

During the transient phases of a change in gear ratio, the drive and synchronization system 4 offers two alternative modes of operation respectively referred to hereinafter as the standard mode and the downgraded mode. The drive and synchronization system 4 operates in standard mode when no critical event indicative of a state of operation of the reversible electric machine 24 or of the battery 43 that powers it has been detected. By contrast, it operates in downgraded mode when such a critical event has been detected. The critical event corresponds, for example, to the detection of a malfunctioning of the reversible electric machine 24 or to the detection of a state of charge of the battery 43 associated with the reversible electric machine 24 which is above a maximum threshold charge.

The critical event may also correspond to the detection of a temperature lower than a minimum temperature of use of the battery or of a temperature higher than a maximum temperature of use of the battery.

In standard mode, the lock-up device 42 is in its released state, the coupling device 26 is operated in such a way that it remains in a coupled position if it already was in that position, or moves from the uncoupled position into a coupled position. The reversible electric machine 24 is controlled according to a signal representative of a setpoint rotational speed of the countershaft 5.

In response to the detection of a critical event, the drive and synchronization system 4 switches over into downgraded mode. The lock-up device 42 is then moved from its released state into its lock-up state. The coupling device 26 is then controlled according to a signal representative of a setpoint rotational speed of the countershaft 5 so that the coupling device 26 applies a resistive torque that allows the countershaft 5 to attain the setpoint rotational speed of the countershaft 5. The coupling device 26 thus acts as a gearbox brake.

Although the invention has been described in connection with a plurality of particular embodiments, it is obvious that it is in no way limited thereto and that it comprises all technical equivalents of the means described and combinations thereof where these fall within the scope of the invention as defined by the claims.

In the claims, any reference sign between parentheses cannot be interpreted as limiting the claim.

The invention claimed is:

1. A module for a system for driving and synchronizing a countershaft of a transmission gearbox, said module comprising:
    a bearing part intended to be mounted without an ability to rotate on a chassis of a vehicle;
    a coupling device able to rotate with respect to the bearing part comprising an input element intended to be rotationally coupled to a reversible electric machine and an output element intended to be rotationally coupled to the countershaft, the coupling device having a coupled state in which a clutch device is able to transmit torque between the input element and the output element and an uncoupled state in which the input element and the output element are uncoupled; and
    a lock-up device which has a lock-up state in which said lock-up device blocks the rotation of the input element of the clutch device with respect to the bearing part, and a released state in which said lock-up device allows the input element to rotate with respect to the bearing part.

2. The module according to claim 1, wherein the lock-up device comprises a mobile element able to move between a lock-up position in which said mobile element is in contact with the input element in order to block the rotation thereof, and a released position in which said mobile element is distanced from the input element in order to allow the rotation thereof.

3. The module according to claim 2, wherein the input element comprises an input hub which is supported and guided in rotation inside the bearing part and wherein, in the lock-up position, the mobile element is in contact with the input hub.

4. The module according to claim 3, wherein the lock-up device comprises a plurality of orifices made on an external perimeter of the input hub and wherein the mobile element is a pin which is mounted to slide in a bore made in the bearing part and which has an end which is inserted into one of the orifices when the pin is in the lock-up position.

5. The module according to claim 4, wherein the orifices have chamfered entrances and the pin has a chamfered end, the chamfered entrances and the chamfered end being configured to facilitate insertion of the pin into the orifices in the lock-up position.

6. The module according to claim 3, wherein the lock-up device comprises a plurality of teeth made on an external perimeter of the input hub and wherein the mobile element is a lever articulated about an axis (Y) parallel to and distant from the axis of rotation (X) of the countershaft and which has an end which is inserted between two teeth when the lever is in the lock-up position.

7. The module according to claim 2, wherein the lock-up device comprises a return member configured to return the mobile element to the released position and is connected to a pneumatic or hydraulic operating circuit which is configured to move the mobile element towards the lock-up position.

8. The module according to claim 1, further comprising a reduction gearset which is coupled to the input element of the coupling device and is intended to rotationally couple the input element of the coupling device to the reversible electric machine and wherein, in the lock-up state, the lock-up device collaborates with a gear of the reduction gearset in order to block rotation thereof.

9. The module according to claim 1, wherein the coupling device is a multidisc wet clutch device.

10. A system for driving and synchronizing a countershaft of a transmission gearbox comprising a module according to claim 1, wherein the reversible electric machine comprises a rotor coupled to the input element of the coupling device.

11. A transmission assembly comprising a transmission gearbox which comprises a primary shaft intended to be connected to a main engine, a secondary shaft intended to be connected to driven wheels of a vehicle, and a countershaft able to be coupled to an output shaft and to an input shaft by gearsets, the transmission assembly further comprising a drive and synchronization system according to claim 10, the output element of the coupling device being rotationally coupled to the countershaft.

12. A vehicle comprising a transmission assembly according to claim 11, the main engine being connected to the primary shaft by a clutch device and driven wheels connected to the secondary shaft.

13. A method for controlling a system for driving and synchronizing a countershaft of a transmission gearbox according to claim 10, comprising the step of moving the lock-up device from the released state to the lock-up state in response to the detection of a critical event.

14. The method according to claim 13, wherein the critical event is indicative of a malfunctioning of the reversible electric machine, of a state of charge of a battery that powers the reversible electric machine that is above a maximum charge threshold, of a temperature lower than a minimum temperature of use of the battery or of a temperature higher than a maximum temperature of use of the battery.

15. The method according to claim 13, wherein, in response to an instruction to change a gear ratio when the lock-up device is in the lock-up state, the coupling device is controlled according to a signal representative of a setpoint rotational speed of the countershaft so that the coupling device applies a resistive torque that allows the countershaft to attain the setpoint rotational speed of the countershaft.

16. The module according to claim 3, wherein the lock-up device comprises a return member configured to return the mobile element to the released position and is connected to a pneumatic or hydraulic operating circuit which is configured to move the mobile element towards the lock-up position.

17. The module according to claim 2, wherein the coupling device is a multidisc wet clutch device.

18. A system for driving and synchronizing a countershaft of a transmission gearbox comprising a module according to claim 2 and the reversible electric machine comprising a rotor coupled to the input element of the coupling device.

19. The method according to claim 14, wherein, in response to an instruction to change a gear ratio when the lock-up device is in the lock-up state, the coupling device is controlled according to a signal representative of a setpoint rotational speed of the countershaft so that the coupling device applies a resistive torque that allows the countershaft to attain the setpoint rotational speed of the countershaft.

20. The module according to claim 4, wherein the lock-up device comprises a return member configured to return the mobile element to the released position and is connected to a pneumatic or hydraulic operating circuit which is configured to move the mobile element towards the lock-up position.

* * * * *